United States Patent
Ackerman et al.

(10) Patent No.: US 6,586,046 B1
(45) Date of Patent: Jul. 1, 2003

(54) FLUIDIZED BED APPARATUS AND METHOD FOR TREATMENT OF NONSPHERICAL, NONEQUIAXED PARTICLES

(75) Inventors: John F. Ackerman, Laramie, WY (US); Andrew J. Skoog, West Chester, OH (US); Matthew B. Buczek, Fairfield, OH (US); Jane A. Murphy, Middletown, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,547

(22) Filed: Jan. 26, 2000

(51) Int. Cl.$^7$ ............................................. B05D 7/00
(52) U.S. Cl. .................... 427/213; 34/364; 75/361; 75/363; 75/366; 75/370; 214/17; 214/18; 427/215; 427/216
(58) Field of Search ................. 427/213, 216, 427/215; 34/364; 75/361, 363, 366, 370; 241/17, 18

(56) References Cited

U.S. PATENT DOCUMENTS

| | | | | |
|---|---|---|---|---|
| 3,745,668 A | * | 7/1973 | Vian-Ortuno et al. | 34/57 A |
| 3,816,080 A | * | 6/1974 | Bomford et al. | 29/182.5 |
| 3,921,307 A | * | 11/1975 | Marek et al. | 34/10 |
| 3,932,760 A | * | 1/1976 | Inoue | 250/492 |
| 3,995,815 A | | 12/1976 | Megelas | 241/15 |
| 4,065,060 A | | 12/1977 | Booz | 241/16 |
| 4,115,107 A | * | 9/1978 | Booz et al. | 75/0.5 R |
| 4,469,282 A | | 9/1984 | Booz | 241/16 |
| 4,482,374 A | | 11/1984 | Osborn et al. | 75/0.5 R |
| 4,486,225 A | | 12/1984 | Osborn et al. | 75/0.5 R |
| 4,590,235 A | * | 5/1986 | Troy | 524/439 |
| 4,765,847 A | * | 8/1988 | Arai et al. | 148/15.5 |
| 5,470,385 A | * | 11/1995 | Keemer et al. | 106/404 |
| 5,630,877 A | | 5/1997 | Kashiwagi et al. | 118/623 |
| 5,827,445 A | | 10/1998 | Yoshida et al. | 252/62.54 |
| 5,836,722 A | | 11/1998 | Lacchia | 406/122 |
| 5,964,936 A | * | 10/1999 | Reisser | 106/404 |
| 6,013,370 A | * | 1/2000 | Coulter et al. | 428/403 |

\* cited by examiner

*Primary Examiner*—H. Thi Le
(74) *Attorney, Agent, or Firm*—Carmen Santa Maria; McNees Wallace & Nurick LLC

(57) ABSTRACT

Apparatus and method for producing metallic flake having an environmental coating for use in oxidative and corrosive atmospheres. Fluidized bed techniques are utilized to perform a controlled oxidation of metallic particles that include aluminum. The fluidized techniques permit the formation of a thin, outer shell of alumina over the outer surface of the flake. Because the oxidation is controlled so that the selective oxidation produces a thin outer shell, the particle has good reflectance and the metallic core of the particle is unaffected by the oxidizing treatment. Although the techniques of the present invention are effective for producing a reflective surface on aluminum-containing iron alloys while the core particles can be either magnetically soft or hard, the techniques can be used to produce a reflective surface that is corrosion and oxidation resistant on any aluminum containing alloy. Apparatus that facilitates the controlled oxidation is also set forth.

21 Claims, 1 Drawing Sheet

FLUIDIZED BED APPARATUS AND METHOD FOR TREATMENT OF NONSPHERICAL, NONEQUIAXED PARTICLES

CROSS-REFERENCE TO RELATED APPLICATIONS

This application is related to co-pending applications Ser. Nos. 09/489,717, 09/562,357 and 09/562,358, assigned to the Assignee of the present invention, which provide background and state of the art of the subject matter of the present invention.

FIELD OF THE INVENTION

This invention is generally related to metallic flakes used in coatings such as thin films and paints, and specifically to methods of achieving a uniform, thin, protective coating on certain types of metallic flakes using fluidized beds and fluidized bed techniques.

BACKGROUND OF THE INVENTION

Metallic flakes are added to coatings such as films and paints to achieve a number of desirable effects that include enhanced engineering effects as well as improved artistic effects. One common application for the use of metallic flakes to achieve esthetic effects is in automobile paints wherein the bright flakes provide a luster or sparkle to the automobile finish. Of course, one of the problems with these paints is that the finish of the automobile must be protected with a transparent finish such as a wax or clear coat or the sparkle fades. The fading is due to the oxidation of the metallic flakes. As the flakes oxidize, the oxidized metal flakes are generally not as reflective as the unoxidized metal flakes, so the automobile finish appears to have become dull.

Other uses for metallic flake include incorporation into articles or coatings applied to articles in order to achieve electromagnetic interference suppression, infrared radiation suppression, heat reflectance from hot surfaces and as an insulator. In the latter case, the flakes can act as an electrical insulator even though the flakes are metal, if the flakes can be properly oxidized. When properly oxidized, the flakes are not conductive even in the presence of an electric field, as the oxidized surfaces prevent any continuity of a circuit. However, the oxidation of the flakes typically produces a dull surface finish which reduces the effectiveness of the film as a heat reflector or as an infrared radiation suppressor. In addition to the surface finish of the particle, the relative orientation of the particle with respect to the article surface can have an impact in determining the degree of brightness or reflection or the coating. Of course, when the oxidation treatment on the surface finish of the particles produces bright surfaces, the overall ability of the coating to provide optical reflection is also improved. The problem of relative orientation of non-spherical particles is the subject of a co-pending application assigned to the assignee of the present invention, which is identified as Ser. No. 09/489,717.

Current technology exists to oxidize equiaxed particles and spherical particles containing aluminum using oxygen in fluidized beds. This technology produces a particle in which the selective oxidation of aluminum has been controlled in a manner such that the oxidation of the particles does not adversely affect the brightness of the particles, yet provides the required oxidation resistance and corrosion resistance to preclude further deterioration of the particles while still maintaining sufficient insulative properties of the particles. But these spherical and equiaxed particles are not as effective as flake particles for esthetic uses and for engineering uses such as heat reflectance, infrared radiation suppression and electromagnetic interference suppression. However, current fluidized bed technology cannot effectively be used in a similar fashion for the selective oxidation of flake. Other available processes utilize solution coatings in combination with fluidized bed processes to form protective barriers on spherical and equiaxed particulate.

There is, however, a need for an effective method to produce metallic flake particles using a fluidized bed that are oxidized in a controlled manner so as not to unduly affect its brightness and ability to reflect radiation in the infrared and visible light spectra while still retaining properties such as the ability to act as electrical insulator.

BRIEF SUMMARY OF THE INVENTION

The present invention provides metallic non-spherical particles of aluminum containing alloys in which the outer surface of the particles undergo a controlled oxidation utilizing fluidized bed techniques. As used herein, spherical particles refers both equiaxed particles and spherical particles in which the aspect ratio of the particles is about one or very close to one, while non-spherical particles refers to particles having an aspect ratio greater than one and less than about two hundred, and typically greater than ten and less than fifty and includes flake.

In one form, the present invention includes non-spherical particles made from a metallic alloy that include at least a small amount of aluminum in which the outer surface has been selectively oxidized in a controlled fashion to form a thin protective ceramic shell of alumina having good reflectance while the metallic core within the shell is substantially unaffected by the oxidizing treatment.

In another form, the present invention provides a method for selectively oxidizing the aluminum-containing alloy non-spherical particles in a controlled fashion utilizing fluidized bed techniques. The method permits the formation of a thin protective transparent alumina shell or jacket around the particles to provide environmental protection and electrical insulation capabilities, but without adversely affecting the brightness characteristics associated with metallic reflectance required for infrared radiation suppression and heat reflectance. The brightness of the oxidized particle is characterized by a reflectance of at least 60%. The method of the present invention requires the specific injection of oxidizing agents into a fluidized bed of particles suspended at an elevated temperature in a flow of reducing gas at a predetermined rate. The ratio of the weight/volume of the oxidizing agent to the weight of the non-spherical particles is predetermined to achieve the desired oxidation.

In another form of the method, the non-spherical particles are mixed with fluidizing aids to enhance the selective oxidation of the non-spherical particles without either agglomeration or spouting of the particles that can otherwise result from their shape. Spouting is a process in which particles are blown in an uncontrolled fashion from a controlled, substantially equilibrium-type suspension. The careful selection of processing aids and control of the processing parameters within the fluidized bed permits the controlled and selective oxidation of the particles without the undesirable effects of either agglomeration or spouting.

In yet another form of the method, at the completion of the oxidation of the non-spherical particles, the non-spherical metallic particles are conveniently and effectively separated from the processing aids.

An advantage of the present invention is that non-spherical metallic particles are produced using fluidized bed techniques. Thus, existing fluidized bed equipment and processes can be modified to accommodate non-spherical particles.

Another advantage of the present invention is that fluidized bed techniques can be used to selectively oxidize aluminum-containing non-spherical particles to provide particles that are resistant to environmental deterioration in corrosive and oxidative atmospheres at elevated temperatures. These particles can be oxidized to provide this transparent, environmentally resistant protective layer in a controlled fashion with minimal effects on the reflective capability of the outer surface. These particles, although oxidized, have improved optical reflection capabilities over prior art oxidized flakes, and the improved reflection capabilities extends to electromagnetic and radiation capabilities as well.

Still another advantage of the present invention is the ability to combine metallic non-spherical particles with processing aids in fluidized bed equipment in order to achieve a controlled suspension of the particles within the fluidized bed during heat treatment and oxidation in the fluidized bed. Associated with this advantage is the additional advantage of being able to separate the oxidized and heat treated non-spherical particles from the processing aids so that the particles can be used in subsequent applications with little or no additional processing.

Continuing and often interrelated improvements in processes and materials, such as the improvements of the present invention, can provide cost reductions and major increases in the performance of devices such as aircraft gas turbine engines, lamps, composites and the like.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
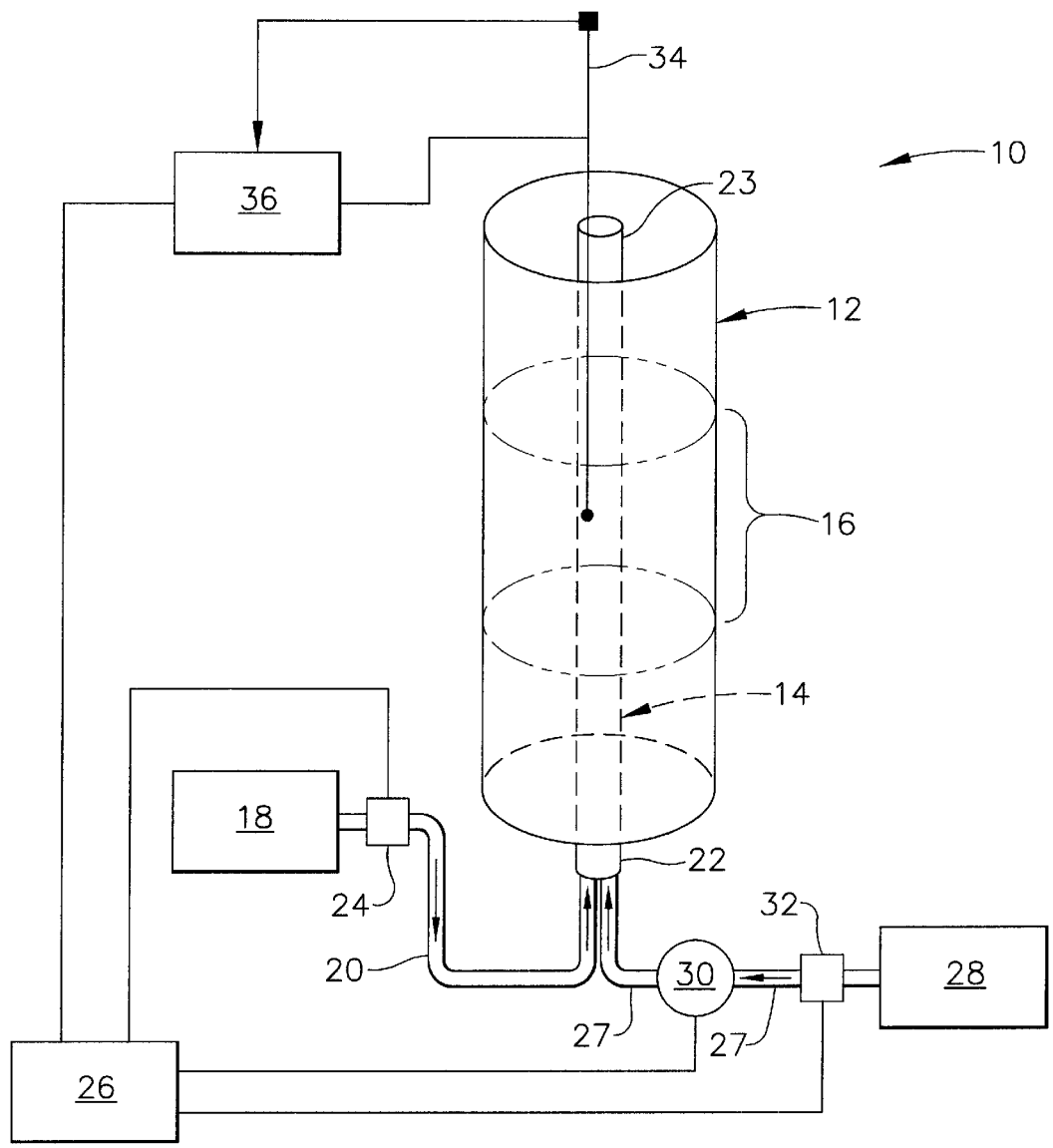
FIG. 1 is a schematic diagram of the fluidized bed apparatus used to produce the non-spherical flakes of the present invention.

In addition to the non-spherical particles of aluminum containing alloys, the present invention sets forth both the processes and modifications/improvements to well-known fluidized bed apparatus required to produce these non-spherical particles.

Non-spherical particles are produced by processing atomized powders of alloys, typically by ball-milling. A description of non-spherical particles and the method of producing such non-spherical particles that can be used in the present invention is the subject of a co-pending application assigned to the assignee of the present invention, which is identified as Attorney Docket No. 13DV-13129. Due to the severe cold-working imparted to the particles in transforming them from an equiaxed morphology to a non-spherical morphology, it is frequently desirable to stress relieve the particles to remove the cold work and to recrystallize the particles. This stress relief can be accomplished in the apparatus of the present invention in conjunction with the oxidation process.

Referring now to FIG. 1 which shows the fluidized bed, liquid oxidant oxidation system of the present invention, the apparatus 10 is comprised of a furnace 12 that can achieve elevated temperatures sufficient to stress relieve the non-spherical particles. A suspension tube 14 extends through the heating zone 16 of furnace 12 in a vertical fashion. The tube is comprised of an inert material that can withstand high temperatures. Typically, tube 14 is made from a superalloy material having excellent strength and ductility such as Inconel. Alternatively, the tube may be made from ceramic material, such as alumina or silica. Superalloy materials are preferred, as their counterparts of ceramic materials, although adaptable for use, are brittle and must be handled with care. But, suspension tube 14 is not restricted to such materials, and any material that can withstand the furnace temperatures may be used. Suspension tube 14 is connected to a supply of a reducing gas mixed with an inert gas 18. A closed conduit 20 between gas supply 18 and the bottom 22 of suspension tube 14 provides the necessary connection. As used herein, the bottom 22 of suspension tube 14 is that portion of tube 14 that extends below heating zone 16. An upper end 23 of suspension tube 14 is open to the atmosphere. Appropriate valving and controls 24 are provided to meter the gas mixture at appropriate rates, as will be explained. Valving and controls 24 are interfaced to a controller 26 that regulates the operation.

The bottom 22 of suspension tube 14 is sealed to prevent aspiration of air into the tube. Also connected to the bottom of suspension tube 14 is a connection to a supply of oxidant 28. The injection of oxidant into the tube can be assisted by a micropump 30. The metering of oxidant from supply 28 to suspension tube 14 is regulated by second valving and controls 32 that are also interfaced with controller 26. At least one thermocouple 34 is inserted into suspension tube 14 to regulate the temperature of the portion of suspension tube 14 that is within heating zone of furnace 16. Thermocouple 34 is connected to furnace controls 36 which in turn may be connected to controller 26, so that complete automation of the process can be accomplished if so desired.

In one embodiment of practicing the process of the present invention, non-spherical particles are introduced into suspension tube 14. The fluidized bed system of the present invention is designed to accommodate non-spherical particles of any composition. A preselected mass of aluminum-containing non-spherical particles is introduced into suspension tube 14 while a suitable gas mixture is introduced into suspension tube 14 from gas supply 18. Although argon (Ar) may be used without mixing with any other gas, the preferred mixture of gas is hydrogen, $H_2$, and argon (Ar) which are commercially available and relatively inexpensive. The addition of hydrogen to the argon provides a mixture that is more reducing than Ar alone. Hydrogen may be mixed with a volume of inert gas such as argon over a broad mixture range of from 0.1% to 99% hydrogen. The amount of hydrogen in the mixture must be sufficient so that undesirable oxidation does not occur. As used herein and unless otherwise indicated, "gas" refers to the use of inert gas alone and to any mixtures of inert gas with hydrogen that provides a reducing atmosphere Any non-spherical particle having a metallic alloy composition that contains a small amount of aluminum may be used in the application of the present invention, such as FeAl binary alloy and FeCoAl ternary alloy. These alloys are magnetic and can retain their magnetic capabilities after the oxidation processing of the present invention. Furthermore, the thin, transparent shell formed by the present invention will protect the particles thereby inhibiting deterioration of their magnetic performance that otherwise may result from oxidation of iron over time. Two preferred alloys are set forth in the co-pending application assigned to the assignee of the present invention, which is identified as Attorney Docket No. 13DV-13129 discussed previously. The binary alloy is comprised of, in weight percent, Al in the range of about 2% to about 20% with the balance Fe and incidental impurities. The ternary alloy is comprised of, in weight percent, Al in the range of 2–20%, 30–65% Co in the range of and the balance Fe and incidental impurities.

While the operation of the apparatus is described as controlled by a controller 26 that provides the advantage of automating the process while providing the capability of instantaneously receiving feedback from various sensors positioned within the system to monitor preselected conditions, analyzing the data received from the sensors and immediately adjusting the relevant controls so that operation of the apparatus remains within preselected parameters, it will be recognized by those skilled in the art that use of controller 26 is optional and successful operation of the apparatus can also be accomplished without the use of a controller. Parameters can be maintained using standard controls and associated sensors with techniques known in the art.

The mass, type (by composition), approximate size and aspect ratio of preselected, non-spherical particles added to suspension tube 14 is entered into the controller. Based on this input, the controller calculates the required flow rate of gas required to fluidize the preselected, non-spherical particles without spouting the particles into the air at an upper end 23 of suspension tube 14, and the appropriate amount and rate of oxidant required to be injected into the tube to achieve the desired oxidation results. The preferred oxidant is oxygen ($O_2$). However, the oxidant can also be a liquid such as distilled or demineralized water, due to its ready availability, low cost, easy storage and dissociation into hydrogen and oxygen. The furnace generally is preheated prior to fluidization or may be heated after appropriate fluidization is achieved.

The controller sends an appropriate signal to the controls and valving of gas, which is then introduced through conduit 20 into bottom 22 of suspension tube. The flow rate of the gas not only achieves the desired suspension of particles, also referred to as fluidization, without undesirable spouting of the non-spherical particles, but also creates a positive pressure of gas that prevents the aspiration of air into the upper end 23 of suspension tube. A pressure sensor (not shown) is part of the controls and valving 24 for the gas to assure that the appropriate pressure of gas is introduced.

If the furnace is not preheated prior to fluidization, then when proper fluidization is achieved, controller 26 provides a signal to the furnace controls 36 that activates heating of furnace 12. The apparatus is heated until the temperature within suspension tube 14 located within heating zone 16 achieves a temperature above about 1112° F. (600° C.). As the temperature is increased, it may be necessary to adjust the flow of gas to prevent spouting. Thus, a heated tube with flow adjusted prior to flake addition makes it easier to achieve an acceptable fluidization.

Once thermocouple 34 indicates that a predetermined temperature within the range has been achieved and flake is at temperature, valve 32 connected to oxidant supply 28 is opened. Oxidant fluid is metered from oxidant supply at a rate based on the mass of non-spherical powder introduced into tube 14. The ratio of oxidant to powder is based on mass, and oxidant is injected at a rate in the range of about 0.01–10.0 liters per minute (l/min) of oxidant for each 20 pounds (9072 g) of non-spherical powder in tube 14. In a preferred embodiment for the alloys discussed above, $O_2$ is injected at a rate of about 1.2 l/min per 20 lb. (9072 g) of non-spherical powder. The oxidant is injected into the bottom 22 of suspension tube by gas pressure or a micropump 30 which is activated by the controller when second valve and controls 32 associated with the oxidant supply are activated. The oxidant preferentially reacts with aluminum in the heated metal alloy to form alumina within the heating zone 16 of furnace. While $O_2$ is the preferred oxidant, other oxidants that have been used successfully include water, $CO_2$, formic acid, $H_2CO_2$, and formaldehyde.

After these conditions have been maintained for about one to four hours at a temperature between about 1200–1400° F. (649–760° C.), and preferably at about 1400° F. (760° C.), the temperature within suspension tube 14 is raised to about 1500° F.±25° F. (816° C.±14° C.), as an appropriate signal is sent by controller 26 to furnace controls 36 to increase the temperature, with lower temperatures typically requiring longer times. This temperature is maintained for at least one hour. It may also be necessary to adjust the flow of reducing gas to prevent spouting as the temperature is increased. However, this can be accomplished either manually or by a preprogrammed sequence. Oxidant, $O_2$ in the preferred embodiment, is added and fluidizing gas is maintained throughout the time period at a flow rate in the range of approximately 0.027–0.054 l/min (27–54 cc/min). At the completion of the holding period, in the preferred embodiment, 1 hour at 1500° F., the flow of oxidant may optionally be stopped before the system is allowed to cool to ambient. As used herein, ambient means temperatures below about 40° C. (100° F.). Once thermocouple 34 indicates that temperatures within ambient have been achieved, computer 26 sends a signal to valves and controls 24 of the gas to stop the flow of gas from gas supply 18. The non-spherical particles then settle to the bottom 22 of the tube, from which they can be removed for subsequent use in applications such as described in co-pending application assigned to the assignee of the present invention, which is identified as Attorney Docket No. 13DV-13124 previously discussed.

It has been found that at temperatures within an expanded range of about 1300–1600° F. (704–871° C.), the selective oxidation of the aluminum in the metal alloy preferentially and successfully can be achieved using injection of $O_2$ at flow rates of between about 0.01-10.0 l/min of $O_2$ per 20 pounds of non-spherical powder when fluidization is accomplished using Ar as a fluidizing gas. The oxidation of the non-spherical particle surfaces occurs in a controlled manner because the partial pressure of oxygen available to form a protective outer scale of alumina on the particle surfaces is restricted by the amount of $O_2$ introduced into the tube. The aluminum in the particles is exposed to a sufficient amount of oxygen so that a thin protective shell of alumina is formed on the exposed surfaces of the particles. Because the atmosphere within the tube is controlled so that there is not an excess of oxygen present during the heating, thick scales of alumina or other metal oxide products on the outer surfaces of the particles resulting from overoxidation of the alloy is avoided. Not only is the protective shell thin, but unlike a thick metal oxide, the thin shell is relatively transparent, thereby providing a brighter appearance. The transparency provides an improved reflectance to the particles, the particles reflecting at least 60% of incident radiation. The thermodynamics of the oxidation of aluminum to form alumina, $Al_2O_3$, not only results in the formation of a thin alumina shell, but also in the preferential formation of alumina, $Al_2O_3$, to the substantial exclusion of other oxides such as iron oxides ($Fe_2O_3$; $Fe_3O_4$). When an excess of oxygen is present, these other oxides can form since the aluminum at and below the surface is quickly exhausted by formation of alumina. The remaining excess oxygen is thus available to form oxides with other available elements at or near the surface, since the driving force of formation of these oxides is likely lower than for the diffusion of oxygen into the matrix where additional alumina is formed. The relative purity of the alumina formed at the surface of the non-spherical particles and the substantial lack of formation of other contaminating oxides contributes to the improved brightness of the oxidized non-spherical particles formed in accordance with the present invention. Furthermore, once the alumina scale has formed, even though thin, the alumina inhibits the diffusion of elements that may readily be oxidized, such as Fe, to the surface of the article. And, because the alumina scale is thin, an ample reservoir of aluminum is present below the thin protective alumina scale. This reservoir of aluminum provides the additional benefit of preferentially forming additional alumina when oxygen diffuses through the outer alumina scale rather than combining with other elements to form less desirable or even detrimental oxides.

In another embodiment of the present invention, the non-spherical particles are mixed together with a fluidization aid and introduced into suspension tube 14. The fluidized bed apparatus of FIG. 1 is utilized to fluidize both the non-spherical particles and the fluidization aid. The fluidization aid is an inert powder such as alumina or silica or combinations of these powders. The inert powder has a spherical morphology and is sized such that the spherical diameter of the inert powder is matched to be about the size of the maximum dimension of the non-spherical particles that are to be heat treated in the fluidized bed apparatus. The processing aids are useful in certain circumstances, such as when the non-spherical powders are sized so that they are blown from the tube during introduction of the gas, that is, when they have a tendency to spout. The processing aids assist in preventing the spouting. The processing aids are also useful when particles that are to be heat treated in the fluidized bed have a tendency to agglomerate due to a build-up of static charges. The inert spherical powder serves to separate the particles and prevent the cohesive forces from agglomerating them, particularly at low gas flow rates. The preferred ratio of the mass of the non-spherical metallic powders to the spherical processing aid powders is about 10:1 and less. Below a ratio of about 1:100 (powders to processing aid), however, the benefits of the processing aid are lost as the separation of the flakes can become difficult and the yield decreases.

When these fluidization aids are used, the principles of operation are identical to those discussed above when no processing aid is used. The primary difference is the flow rate of gas that must be introduced into the system in order to fluidize the additional mass of spherical, inert particles. When the non-spherical particles are aluminum-containing alloys that are to be oxidized as set forth above, the flow rate of oxidant introduced into the apparatus remains within the limits previously described and is based on the mass of non-spherical particles. No additional oxidant is required, as the processing aids are inert, and will not consume any of the oxidizing agent.

In another form of the process and apparatus of the present invention, a reservoir of liquid oxidant and a micropump replaces a gas supply. The micropump controls the metering of the amount of oxidant introduced into the bed in the manner described previously. The preferred liquid oxidant is water.

In yet another form, the fluidization aid is fluidized in tube 14 and brought to the elevated temperatures required for the reaction. At this time, the metal alloy flakes are introduced into the tube, mixing with the fluidization aids.

Another feature of the apparatus and method of the present invention is the ability to separate the spherical inert processing aids from the heat treated non-spherical particles. Because the spherical alumina and silica particles are chosen to have the same size as the major dimension of the non-spherical particles, the traditional methods of separation by screening is not effective. While other separation methods are available for magnetic flake, such as the Davis Tube technique or magnetic separation techniques, these methods are not effective for separating non-magnetic particles from the inert processing aids. However, the apparatus of the present invention can be adjusted to separate non-spherical particles from the spherical processing aids. After thermocouple 34 indicates that a preselected temperature near ambient has been achieved, instead of stopping the flow of the fluidizing gas, controller 26 sends a signal to valves and controls 24 to increase the flow of gas, until the particles are in proximity to the upper end 23 of tube 14. The flow of gas can be achieved until spouting is initiated, followed by carefully reducing the flow of gas to the point at which spouting is terminated. Of course, the flow rate of gas required to achieve this condition will vary depending upon the total loading of non-spherical powders combined with the spherical processing aids. This condition is maintained for a preselected period of time. The effect is that, over a period of time, the non-spherical particles tend to segregate to the top of the tube, while the spherical particles segregate to the bottom. The required time for a typical loading is about one hour. After segregation, the non-spherical particles can be removed from the tube. This can be accomplished by increasing the flow of gas until the non-spherical particles are "spouted" from the upper end 23 of the tube and captured in a convenient manner. Alternatively, the gas flow may be halted and the non-spherical particles carefully can be poured from the upper end of the tube. As an example illustrative of the present invention, a mixture of FeAl flake and of 200 mesh silica in a ratio of 1:4 flake to silica was placed in a 1" diameter tube and fluidized with 1.9 l/min (4 cubic feet per hour (CFH)) of hydrogen gas. On achieving the oxidation temperature of 1500° F., the metal flake was oxidized by introducing 0.01 l/min (0.01 grams/minute) of water for about one hour. After the hour of oxidation, the flow of water was stopped and the oxidized metal was then separated by increasing the hydrogen gas flow rate to 2.2 l/min (4.7 CFH).

Non-spherical particles that contain even a small concentration of aluminum produced in the apparatus of the present invention utilizing the methods of the present invention are suitable for use in environmentally challenging environments. The thin alumina shell forming an exterior shell provides excellent environmental protection for the particles so that the particles can be incorporated into coatings used in corrosive environments and in oxidative environments. Because the shell is thin and does not exhaust the supply of aluminum in the alloy, aluminum is available to form additional protective alumina if the shell is penetrated or fractured. As a result of the controlled oxidation of the exterior of the non-spherical particles, the particles retain a metallic appearance, retaining a substantial reflective ability due to retention of brightness. As a result, the particles can be used in coating applications where heat reflection and infrared radiation reflection is an important consideration. Yet, because of the formation of the thin, protective shell over the particles, the particles can be used in environments that are corrosive or oxidative or high temperature, with little concern about deterioration of the particles. And since the shell is protective, the composition of the interior of the particle can be engineered to perform without concern of its deterioration. For example, a particle comprised of a FeAl composition, as discussed above, can be used in applications in which the soft magnetic capabilities of the particle can be utilized without undue concern about the deterioration of those capabilities as a result of oxidation of the iron content.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method for forming non-spherical aluminum-containing metallic particles to provide them with resistance to oxidation and corrosion, electrical insulation capabilities and sufficient brightness to provide heat reflectance and infrared radiation suppression, comprising the steps of:
   placing a preselected mass of non-spherical, aluminum-containing particles in a tube having an upper end open to the atmosphere and a sealed lower end having at least one sealed connection;
   placing the tube into a furnace;
   introducing a non-oxidizing, fluidizing gas into the tube through the at least one sealed connection at a flow rate sufficient to provide a positive flow of gas out of the upper end of the tube and to fluidize the particles within the tube so that the fluidized particles are within a heating zone of the furnace; then
   heating the furnace so that a temperature within the tube is within a preselected range; then
   introducing an oxidant gas at a preselected rate into the tube through the at least one sealed connection; and
   forming a thin protective ceramic shell over external surfaces of the non-spherical particles as the oxidant reacts with the metal, the ceramic layer characterized by transparency for improved reflectance of at least 60% and resistance-to-environmental deterioration.

2. The method of claim 1 wherein the preselected temperature range is at least about 1112° F. (600° C.).

3. The method of claim 2 wherein the preselected temperature range is 1300–1600° F. (704–871° C.).

4. The method of claim 1 wherein oxidant is introduced at a rate of about 0.01–10 l/min.

5. A method for treating non-spherical metallic particles to provide them with resistance to oxidation and corrosion in a fluidized bed comprising the steps of:
   mixing a preselected mass of non-spherical, aluminum-containing metal particles with a preselected mass of inert spherical particles, the ratio of the mass of metal particles to inert particles being about 10:1 and lower, the spherical particles being sized so that the diameter of the inert spherical particles is about the same size as the average maximum dimension of the non-spherical particles;
   placing the mixture into a suspension tube having an upper end open to the atmosphere and a sealed lower end having at least one sealed connection;
   placing the suspension tube into a furnace;
   introducing a non-oxidizing, fluidizing gas into the suspension tube at a flow rate sufficient to fluidize the mixture of particles within the tube so that the fluidized particles are within a heating zone of the furnace while substantially preventing oxidation of the metal particles;
   heating the furnace until a temperature of the tube within the heating zone of the furnace is within a first preselected range; then
   introducing an oxidant gas at a preselected rate into the tube to react with the non-spherical metal particles to form a thin protective ceramic layer over external surfaces of the particle, the ceramic layer characterized by brightness for improved reflectance and resistance to environmental deterioration at elevated temperatures in corrosive and oxidative environments, while holding the temperature of the tube within the first preselected range for a preselected time and maintaining the flow of the fluidizing gas; then
   heating the furnace until the temperature of the tube within the heating zone of the furnace is within a second preselected range while maintaining the flow of the fluidizing gas; then
   stopping the flow of oxidant gas;
   cooling the mixture of particles to about ambient temperature; and
   reducing the flow of fluidizing gas into the tube.

6. The method of claim 5 further including the following additional steps:
   after cooling the mixture of particles in the tube, increasing the flow of fluidizing gas into the tube so that the mixture is fluidized so that the particles are positioned just below the upper end of the tube;
   maintaining the flow of gas into the tube for a time sufficient to segregate the non-spherical particles to an upper portion of the mixture near the upper end of the tube and the spherical particles to a lower portion of the mixture;
   reducing the flow of gas into the tube; and
   removing the non-spherical particles from the upper portion of the tube.

7. The method of claim 6 wherein the non-oxidizing, fluidizing gas is a mixture of inert gas and hydrogen.

8. The method of claim 7 wherein the mixture includes by volume, hydrogen of about 0.1% to about 99%, with the balance being inert gas.

9. The method of claim 5 wherein the non-oxidizing, fluidizing gas introduced into the tube is an inert gas selected form the group consisting of Ar, He and $N_2$.

10. The method of claim 9 wherein the inert gas is argon.

11. The method of claim 5 wherein the oxidant gas is selected from the group consisting of $CO_2$ and oxygen.

12. The method of claim 5 wherein the non-spherical metallic particles are flakes having an aspect ratio of between one and about 200.

13. The method of claim 12 wherein the non-spherical particles are flakes having an aspect ratio of between about 10 and 50.

14. The method of claim 12 wherein the preselected mass of inert spherical particles is selected from the group consisting of alumina and silica and combinations thereof, the particles having an average diameter of about a average maximum dimension of the flakes.

15. The method of claim 12 wherein the aluminum-containing flakes are capable of retaining magnetic characteristics at room temperature.

16. The method of claim 15 wherein the flakes are FeAl flakes.

17. The method of claim 15 wherein the flakes are FeCoAl flakes.

18. The method of claim 5 wherein the first preselected temperature is at least about 600° C. (1112° F.) and the preselected time is from about 1–4 hours.

19. The method of claim 5 wherein the first preselected temperature is in the range of 1200–1400° F. (649–760° C.).

20. The method of claim 5 wherein the second preselected temperature is in the range of about 1500° F.±25° F. (816° C. ±14° C.).

21. A non-spherical aluminum-containing metallic particle having a thin, reflective layer of transparent alumina forming a protective outer shell, formed by a process comprising the steps of:

mixing a preselected mass of non-spherical, aluminum-containing metal particles selected from the group consisting of FeAl and Fe CoAl with a preselected mass of inert spherical particles selected from the group consisting of alumina and silica and combinations thereof, the ratio of the mass of metal particles to inert particles being about 10:1 and lower, the spherical particles being sized so that the diameter of the inert spherical particles is about the same size as the average maximum dimension of the non-spherical particles;

placing the mixture into a tube;

placing the tube into a furnace;

introducing a non-oxidizing, fluidizing gas into the tube at a flow rate of about 4 CFH and sufficient to fluidize the mixture of particles within the tube so that the fluidized particles are within a heating zone of the furnace while substantially preventing oxidation of the metal particles;

heating the furnace until a temperature of the tube within the heating zone of the furnace is within a first preselected range of at least about 600° C. (1112° F.); then introducing an oxidant gas at a preselected rate of from about 0.01–10.0 l/min per 20 lbs. (9072 gram) of metal particles into the tube to form a thin protective alumina layer over external surfaces of the particles, the alumina layer characterized by reflectance of at least about 60% and resistance to environmental deterioration at elevated temperatures in corrosive and oxidative environments, while holding the temperature of the tube within the first preselected range of at least 600° C. (1112° F.) for a preselected time in the range of 1–4 hours and maintaining the flow of the reducing gas; then heating the furnace until the temperature of the tube within the heating zone of the furnace is within a second preselected range of between 760° C.–816° C. (1400° F.–1500° F.) while maintaining the flow of the fluidizing gas sufficient to maintain fluidization of the particles; then stopping the flow of oxidant gas;

cooling the mixture of particles to about ambient temperature; and reducing the flow of fluidizing gas into the tube.

* * * * *